(12) United States Patent
Banubakode et al.

(10) Patent No.: US 12,333,614 B2
(45) Date of Patent: Jun. 17, 2025

(54) QUALITY, AVAILABILITY AND AI MODEL PREDICTIONS

(71) Applicant: INTUIT INC., Mountain View, CA (US)

(72) Inventors: Apoorva Banubakode, Mountain View, CA (US); Na Xu, Mountain View, CA (US); Mohsen Samadani, Mountain View, CA (US); Yi Wei, Mountain View, CA (US); Deepankar Mohapatra, Mountain View, CA (US); Conrad De Peuter, Mountain View, CA (US)

(73) Assignee: INTUIT INC., Mountain Vew, CA (US)

( * ) Notice: Subject to any disclaimer, the term of this patent is extended or adjusted under 35 U.S.C. 154(b) by 0 days.

(21) Appl. No.: 18/299,703

(22) Filed: Apr. 12, 2023

(65) Prior Publication Data
US 2024/0346602 A1    Oct. 17, 2024

(51) Int. Cl.
*G06Q 40/12* (2023.01)
*G06F 9/451* (2018.01)

(52) U.S. Cl.
CPC .......... *G06Q 40/123* (2013.12); *G06F 9/451* (2018.02)

(58) Field of Classification Search
CPC .............................. G06Q 40/123; G06F 9/451
See application file for complete search history.

(56) References Cited

U.S. PATENT DOCUMENTS

| | | | |
|---|---|---|---|
| 10,861,106 B1* | 12/2020 | Hunt | G06Q 40/123 |
| 11,055,793 B1* | 7/2021 | Wang | G06Q 40/123 |
| 2012/0109792 A1* | 5/2012 | Eftekhari | G06Q 40/123 726/19 |
| 2019/0356931 A1* | 11/2019 | Marwood | H04N 19/119 |
| 2020/0074322 A1* | 3/2020 | Chungapalli | G06F 18/29 |
| 2022/0100647 A1* | 3/2022 | Hamid | G06F 11/3684 |

* cited by examiner

*Primary Examiner* — Florian M Zeender
*Assistant Examiner* — Matthew S Weronski
(74) *Attorney, Agent, or Firm* — DLA Piper LLP (US)

(57) ABSTRACT

A sequence of data entry screens are configured to collect the data from a user. The method and system receive data entered by a user into a data entry screen. The method and system then determine metrics of the collected data, and ranks the collected data and the data entry screens based on the determined metrics. The ranking is then used to display the next best screen in the sequence for collecting data.

20 Claims, 7 Drawing Sheets

QUALITY, AVAILABILITY AND AI MODEL PREDICTIONS

BACKGROUND

Sequential data entry screens are generally hard-coded, both in content and in sequence. Dynamism/branching is sometimes introduced by special scenarios (e.g. if the user gets married, the user enters the married topic) but the terminus of this branch generally returns users to the branch of the statically ordered trunk. As a result, sequences of data entry often require the user to enter the same information multiple times, or manually input information which could have been inferred from previously provided information. As such, an improvement in screen ordering is therefore desired.

SUMMARY

Embodiments disclosed herein solve the aforementioned technical problems and may provide other technical solutions as well. Contrary to conventional techniques that implement static sequences of static data entry screens, one or more embodiments disclosed herein implement dynamic sequences of dynamically populated data entry screens.

An example embodiment includes a method performed by a processor. The method may comprise displaying, by a user device, a first screen via a graphical user interface (GUI) to a user to collect a first portion of data, where the first screen is part of a sequence of data entry screens that are configured to collect the data from the user. The method may also comprise receiving, by the server, the first portion of data entered by a user into the first screen, determining, by the server, metrics of the first portion of data, ranking, by the server, the sequence of data entry screens based on the determined metrics, and displaying, by the user device, a second screen via the GUI to the user to collect a second portion of data. The second screen is ranked highest among the ranked sequence of data entry screens.

An example embodiment includes a non-transitory storage medium storing computer program instructions, and one or more processors configured to execute the computer program instructions to cause operations. The operations may comprise displaying, by a user device, a first screen via a graphical user interface (GUI) to a user to collect a first portion of data, where the first screen is part of a sequence of data entry screens that are configured to and collect the data from the user. The operations may also comprise receiving, by the server, the first portion of data entered by a user into the first screen, determining, by the server, metrics of the first portion of data, ranking, by the server, the sequence of data entry screens based on the determined metrics, and displaying, by the user device, a second screen via the GUI to the user to collect a second portion of data. The second screen is ranked highest among the ranked sequence of data entry screens.

DETAILED DESCRIPTION OF SEVERAL EMBODIMENTS

To mitigate the above deficiencies, embodiments disclosed herein leverage characteristics of data to be collected by each data entry screen in order to achieve a goal of minimizing the number of data entry points (e.g. number of screens) that need to be manually populated by the end user, thereby minimizing the time spent by the user entering data. Data entry screens are not equally valuable in the data collection process, and therefore the embodiments disclosed herein can take advantage of this discrepancy. In other words, some data entry screens collect more important data than others. Importance of data can be measured by multiple metrics including but not limited to data quality (how much the data informs other data) and conversely data infer-ability (how much the data can be inferred by other data). Likewise, some data entry screens are not as easily populated as others by the end user in the data collection process due to the level of difficulty placed on the end user in collecting the data, and therefore the embodiments disclosed herein can also take advantage of this discrepancy. In other words, some data entry screens request data that may take longer for the end user to collect and enter. Difficulty in collecting and entering the data can be measured by multiple metrics including but not limited to data availability (how easily can the end user collect the requested data).

The figures herein are described with respect to methods of accessing data entry screens and producing an optimal sequence of data entry screens based on the assessment. A specific application (e.g. Intuit TurboTax) is used as a specific data entry example throughout the description for ease of description. However, it is noted that the system and methods are applicable to any software application that provides a sequence of data entry screens to a user for data collection.

In the specific example of TurboTax, it is beneficial for the end user to complete the process of completing and filing their annual income tax return as quickly as possible while not compromising on accuracy. The time required to complete and file their annual income tax return is directly related to the length of the sequence data entry screens presented to the end user. In other words, certain sequences are more efficient in the data collection process, and therefore result in an expedited process, while other sequences result in longer processing time.

The disclosed system and methods achieve these benefits via optimization of data entry screen sequences presented to the end user. For example, the disclosed system and methods determine a dynamic sequence of data entry screens that minimize a burden of data entry placed on the user when using TurboTax, based on data that is easily available to the end user, data that offers high quality information that can be used to auto-populate other data entry screens, and data that can be inferred from other data. The dynamic sequence of data entry screens may be different for each user depending on various factors including but not limited to filing status, personal information, occupation, assets, etc. In either case, the dynamic sequence is optimized for each end user.

Figure 4:
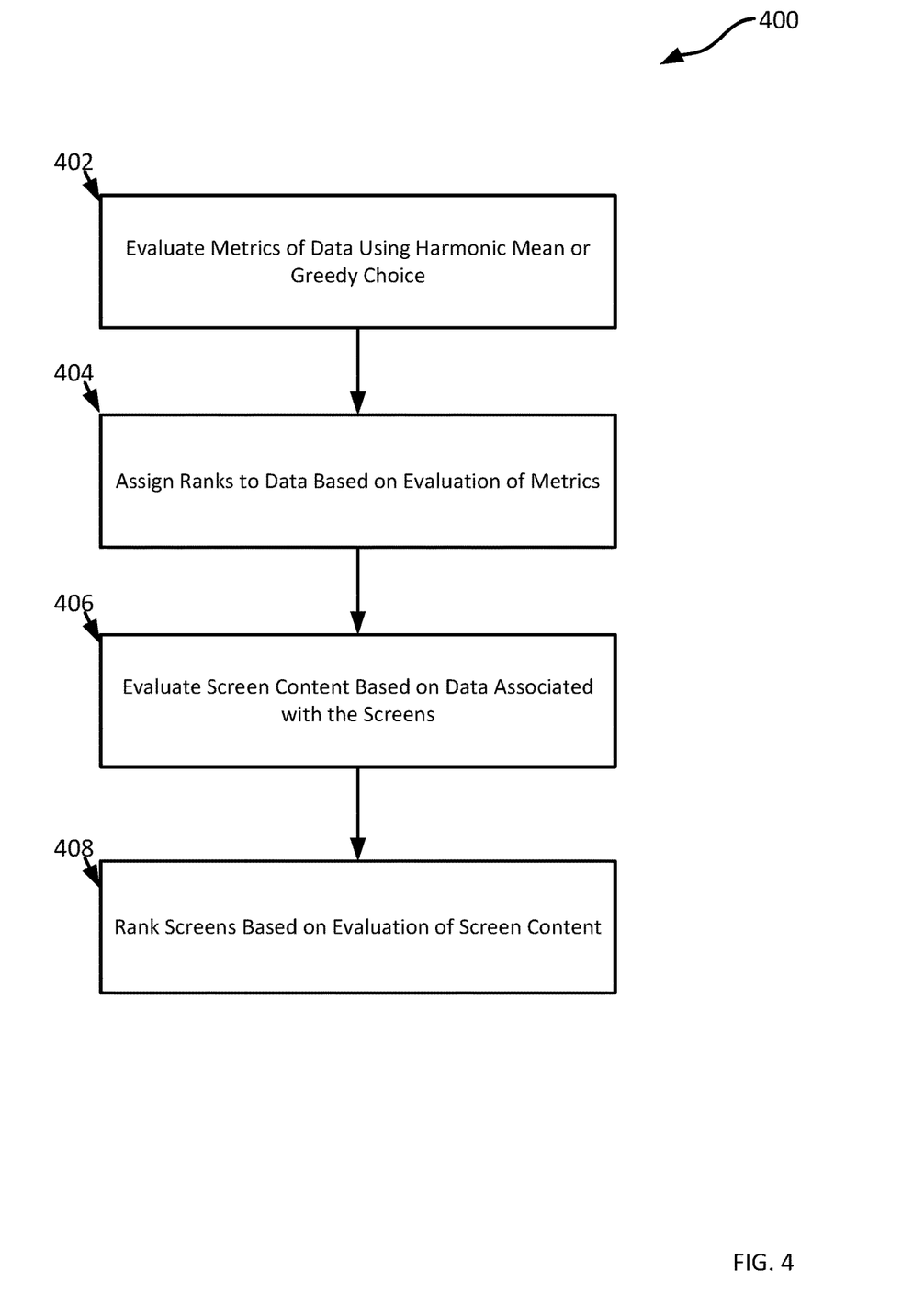
FIG. 4 shows an example method of ranking data entry screens based on ranking algorithms, based on the principles disclosed herein.
Figure 5:
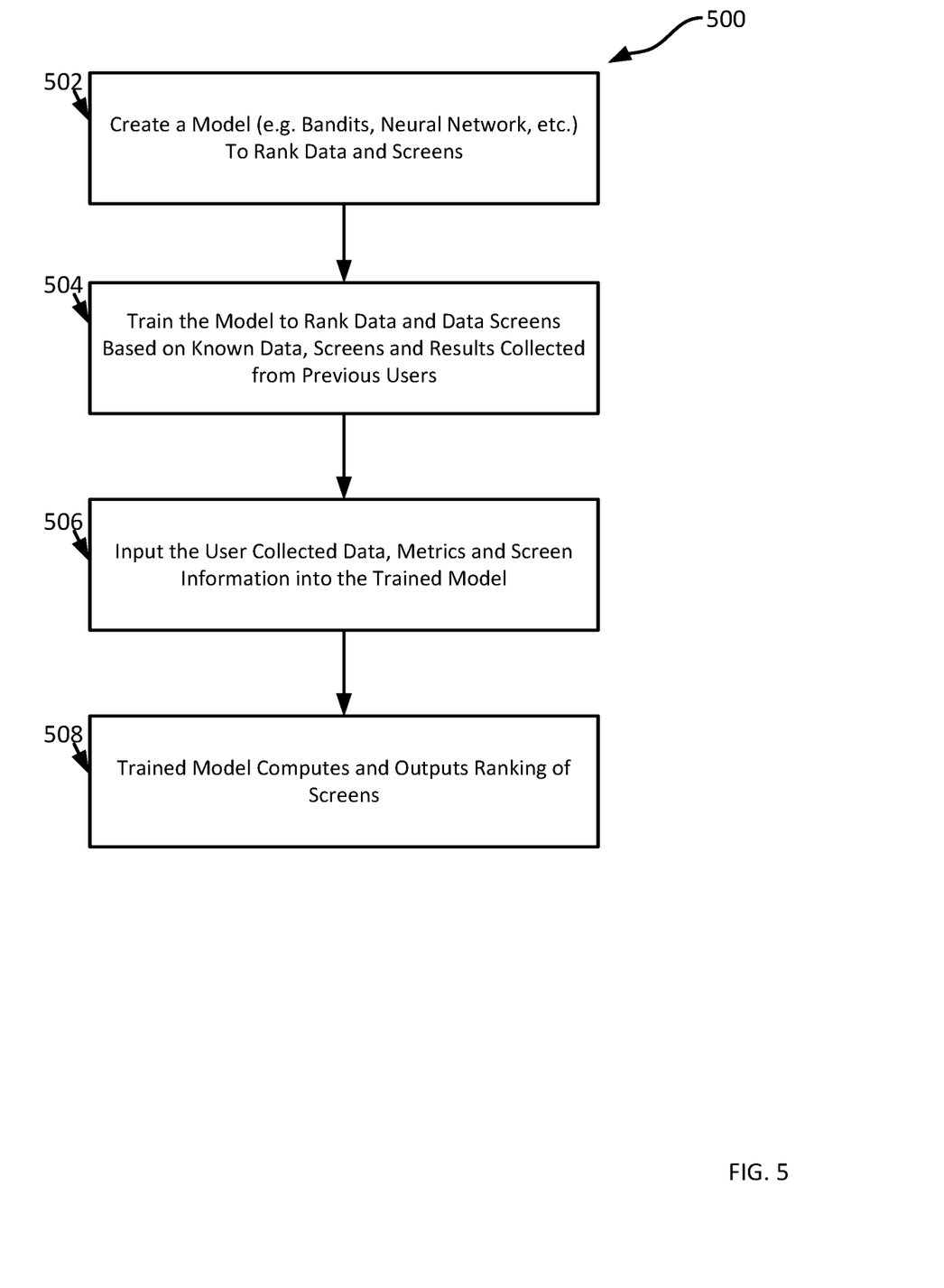
FIG. 5 shows an example method of ranking data entry screens based on ranking models, based on the principles disclosed herein.
Figure 6:
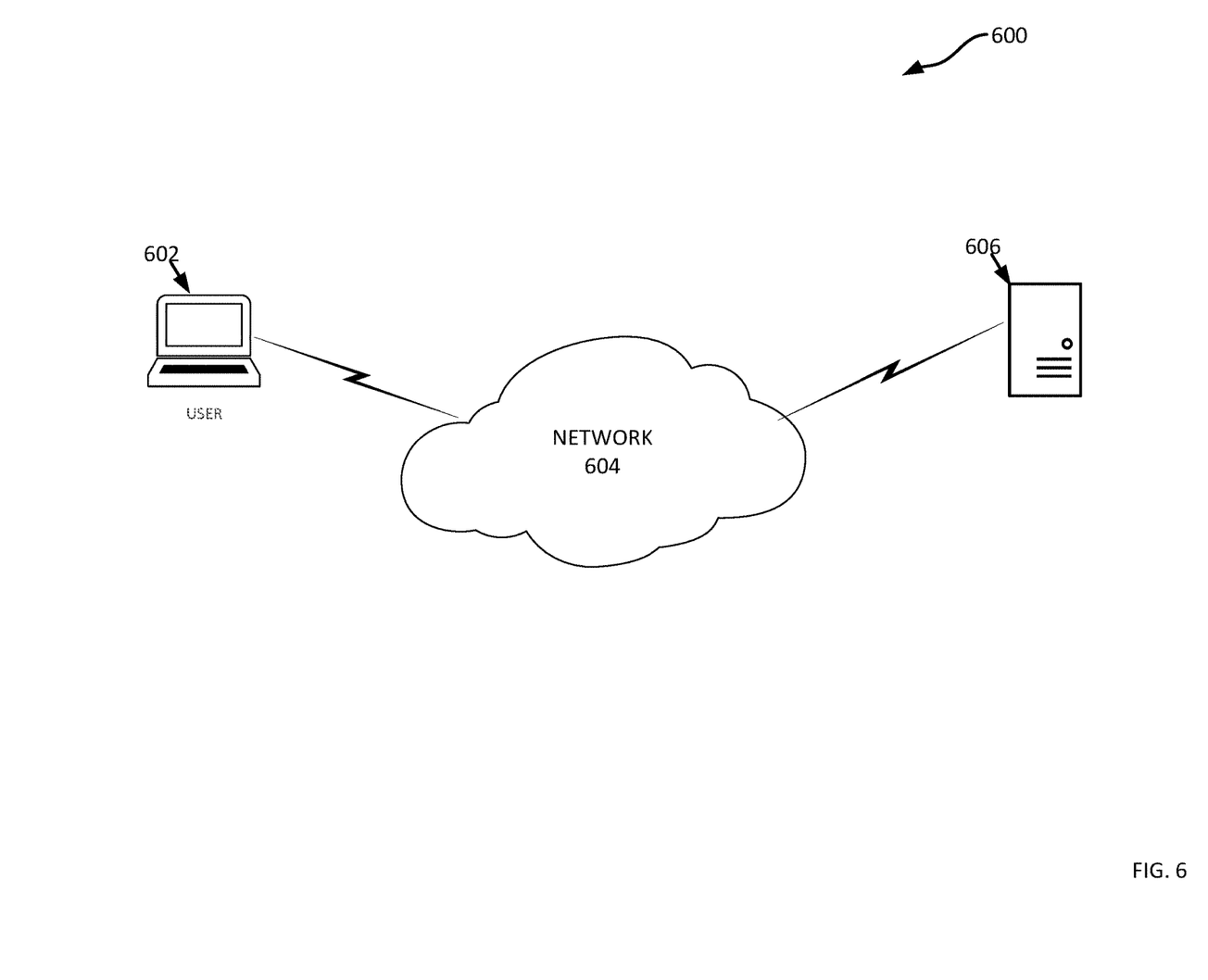
FIG. 6 shows an example of a system of computing devices that implement various features and processes, based on the principles disclosed herein.
Figure 7:
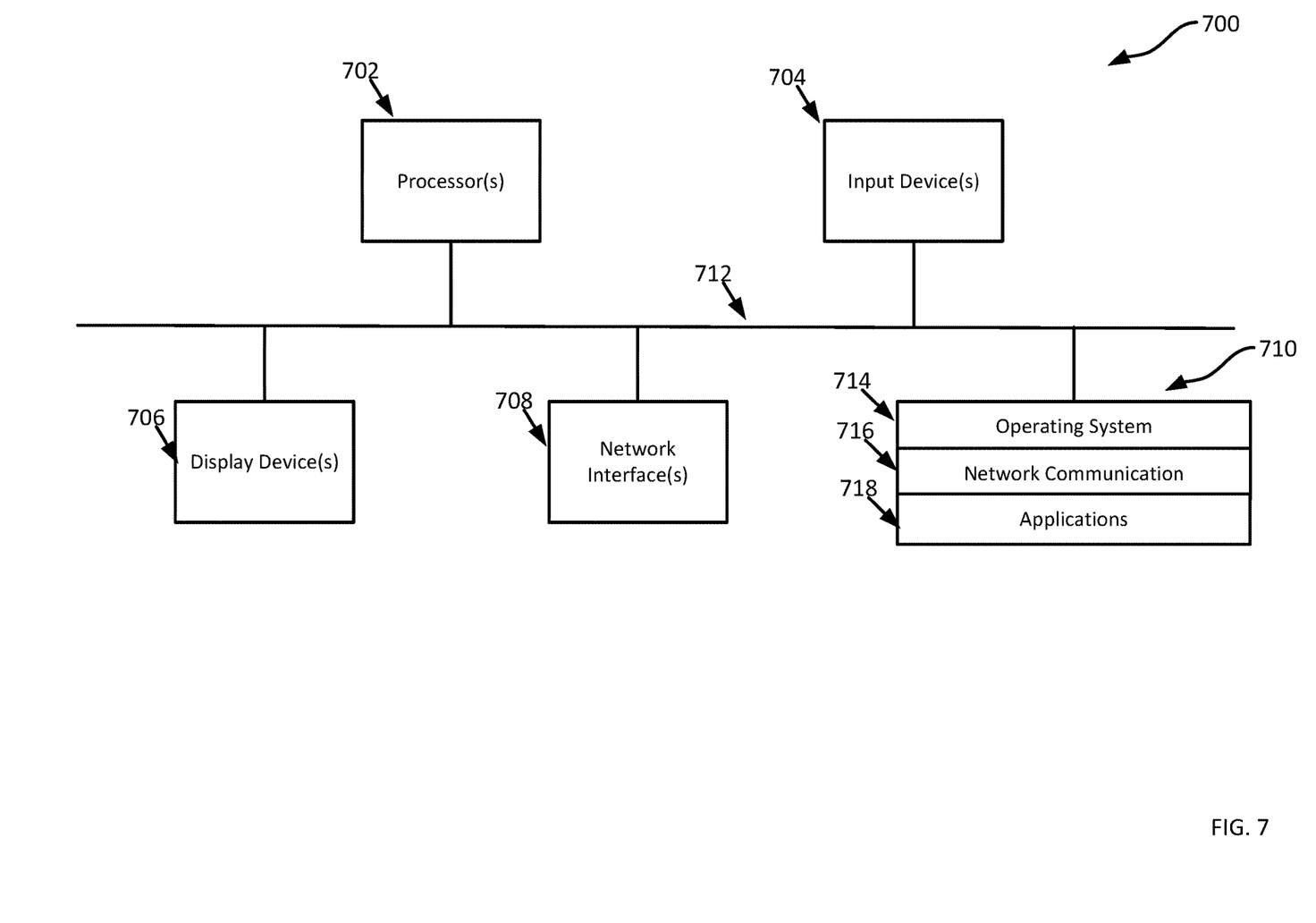
FIG. 7 shows a block diagram of an example computing device that implements various features and processes, based on the principles disclosed herein.

The above-described features are now described in detail with respect to FIGS. 1-7. Specifically, FIGS. 1-5 are flowcharts describing the example methods performed by the system, and FIGS. 6 and 7 show the example hardware for implementing the system.

Figure 1:
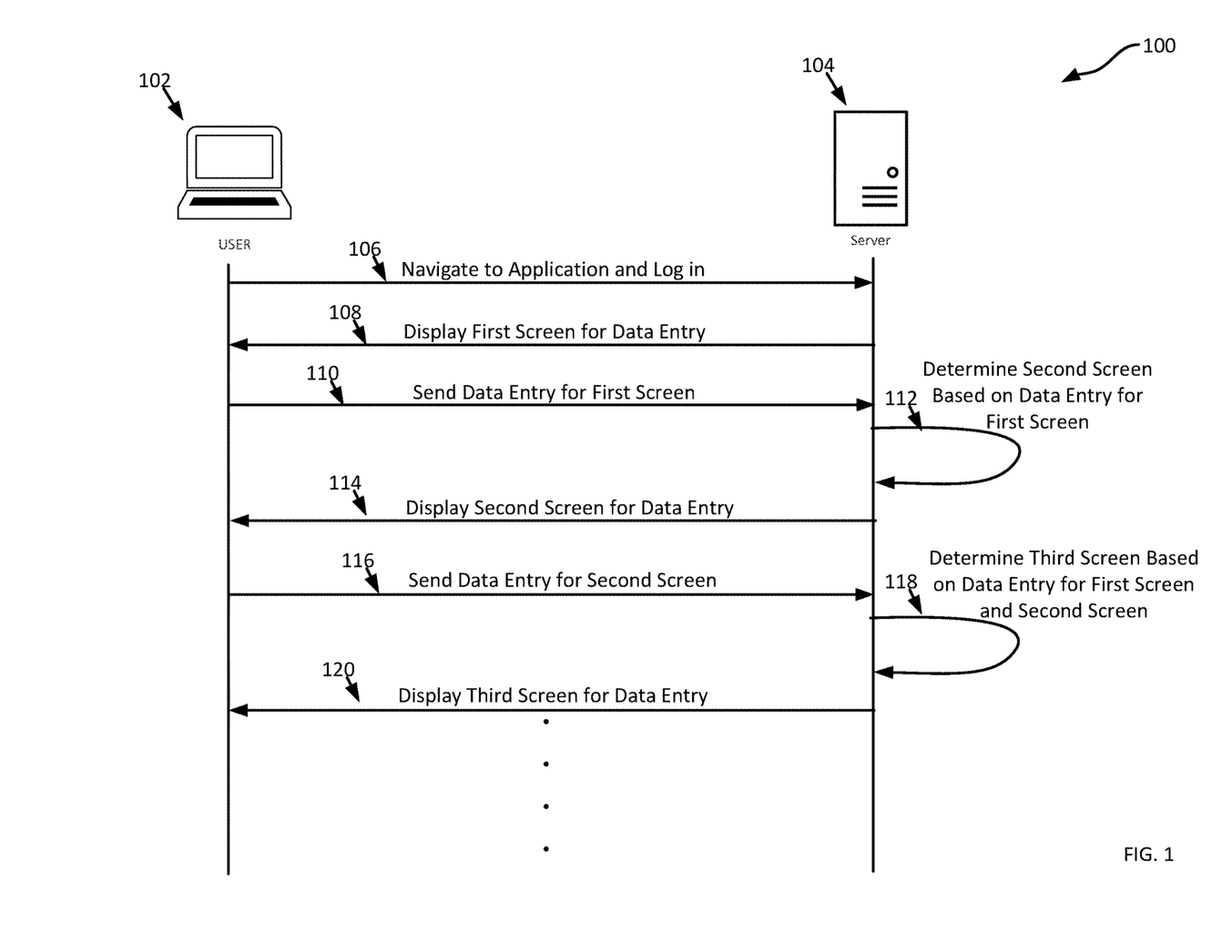
FIG. 1 shows an example method of dynamic navigation of data entry screens, based on the principles disclosed herein.

FIG. 1 shows a generic example method 100 of dynamic navigation of data entry screens, based on the principles disclosed herein. In this example, an end user may utilize computer 102 (or any user device such as a smartphone, tablet, etc.) to open an application (e.g. TurboTax) that requires the user to enter data into a sequence of data entry screens. The application may be running on backend server 104 which may include one or more server devices for supporting the application and associated application databases. In step 106, the user may navigate to the application, create an account if needed, and log-in to the account. Once the user initiates execution of the data entry process (e.g. selects to file an annual tax return), server 104 instructs computer 102 to display the first data entry screen for data entry at step 108. This first data entry screen may be based on information previously collected by the user such as user profile information (e.g. name, address, etc.) or previous data entries (e.g. previous year's tax returns, etc.) if the user is a return customer. The user then enters the data (i.e. fills in the data screen prompts), at which point computer 102 transmits the entered data back to server 104 in step 110. Upon receipt of the entered data, server 104, in step 112, analyzes the entered data to determine the second screen (next best screen of a plurality of possible screens) to display to the user. In one example, the "next best screen" may be the screen that is best for achieving a goal of minimizing the total number of screens or total time of the overall data collection process. As mentioned above, this analysis and determination is based on metrics including but not limited to data availability, data quality, data infer-ability and data similarity which is discussed in more detail below. Server 104 then instructs computer 102 to display the second data entry screen (i.e. the next best screen) for data entry at step 114. This process is then repeated with the user entering the requested data and computer 102 sending the entered data back to server 104 where it is again analyzed in step 118 to determine the third screen (i.e. next best screen) to display to the user in step 120. The overall process described above is repeated a number times until a sequence of data screens is complete and the user's information required to complete the forms (e.g. tax return) is collected for the application.

With the flow described in FIG. 1 in mind, imagine a specific scenario where two separate TurboTax users need to enter their tax information (filing status, address, dependents) and other information on their wage and tax statement (W-2) form. One user may have trusted authentication (one click to connect to the electronic version of their W-2), while the other user is on a computer with no camera and a paper version of the W-2. A current year W2 may be the most information rich document a taxpayer can provide to inform TurboTax whether the user has gone through life changes. The relationship between wages and withholdings can provide an inference on a user's filing status and other information. Because the trusted authentication user has high information availability for their W-2, they may be prompted to provide that information first, and as a result their filing status is inferred and they are asked to simply confirm the information. In contrast, the user having the paper W-2 may be asked filing status first, since the information availability and quality of the fields of a W-2 is lower. Therefore, in this example, both end users are prompted with a different data entry screen and the process repeats. In other words, after each data entry screen is completed by the user, a recursive algorithm runs again (analyzes the importance of the remaining data and screens) to determine the next-best screen to display to the user.

Figure 2:
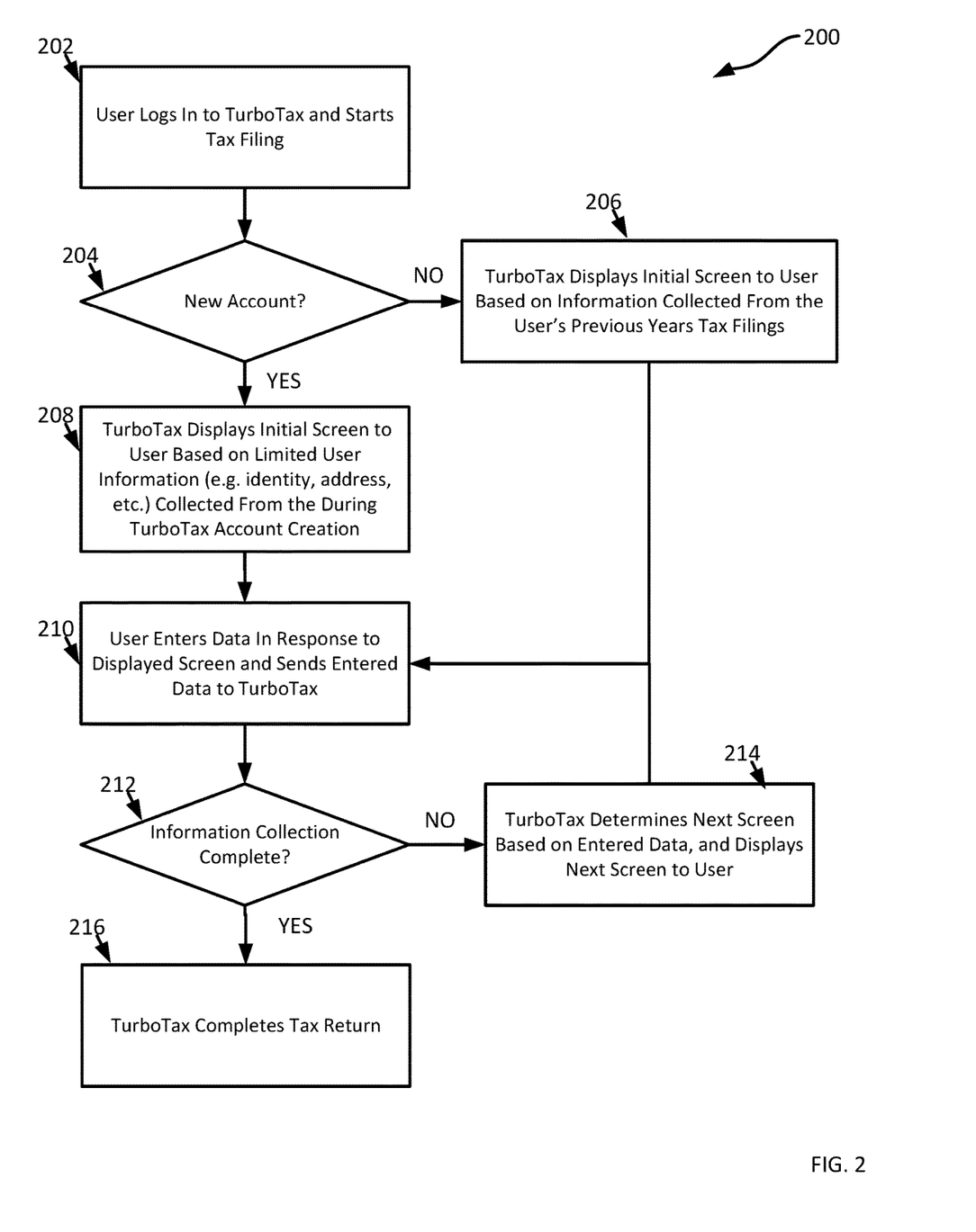
FIG. 2 shows an example method of dynamic navigation of data entry screens, based on the principles disclosed herein.

FIG. 2 shows a specific (e.g. TurboTax) example method 200 of dynamic navigation of data entry screens, based on the principles disclosed herein. For example, in step 202, the user creates a TurboTax account if needed and logs-in to TurboTax to start a tax filing. If TurboTax determines that the user has a new account in step 204, then TurboTax displays, in step 208, an initial screen to the user based on limited user information collected during the account signup process (e.g. identity, address, etc.). If, however, TurboTax determines that the user has an existing account in step 204, then TurboTax displays, in step 206, an initial screen to the user based on previously collected information (e.g. information from the previous year's tax filings that can be confirmed by the user).

It is noted that the initial screen may be determined by analyzing the previously collected information for the user. This analysis may include determination of metrics including but not limited to data availability, data quality, data infer-ability and data similarity of the previously collected data the data to be collected, and use of these metrics to determine the next best screen. For example, if the user is a new user, the system may populate and display a personal information screen with the name/address provided on the account. In contrast, if the user is a previous TurboTax user, the system may additionally populate and display tax related information from previous years tax filings. In addition, this initial screen may pose questions to the user regarding important information such as filing status, the availability of electronic versions of documents and the confirmation of tax information from previous years filings. In either case, the system attempts to determine the best initial screen to display to the user to collect the most meaningful data without placing a high burden on the user, with the goal of streamlining the tax filing process.

After the initial screen is displayed to the user, the user enters the requested data in step 210. TurboTax then determines in step 212 if the information collection process is complete (e.g. the tax information needed to file the tax return is collected). If the information collection process is complete, then TurboTax completes the tax return and displays the results to the user. If, however, the information collection process is not complete and more information is needed to complete the tax filing, then TurboTax determines the next data entry screen in step 214 and repeats steps 210, 212 and 214 as needed until the tax return is complete. Each time a next data entry screen is determined, the system computes the relevant metrics based on the collected data and the uncollected data remaining in order to choose the best next screen with the goal of minimizing the sequence of screens that need user input.

As mentioned above, three metrics may be associated with each datapoint. These metrics include information availability (how easily can we collect this piece of information), information quality (how much this data can inform other data points), information infer-ability (how easily can this information be informed by other data sources). Information availability may be determined from a hard coded table based on the relevant data point, or inferred from the user profile. Information quality and information infer-ability are inversely related to one another and may be determined from a knowledge graph. In order to determine which data to collect from a user, the three metrics are used to rank the data points. Some possible examples of ranking algorithms include: Harmonic mean across the metrics, Greedy choice of any of the metrics, and a Learned model (e.g. bandits, neural network, etc.) based on the metrics and other user information. Once the data points are ranked, various combinations of subsets of the data points (e.g. various candidates for the next screen) are evaluated based on an information similarity metric (how contextually similar the information is to other information). Information similarity may be determined from a hard coded table (e.g. knowledge graph) based on contextual relationships between the data points. The information similarity along with the data point rankings are then used to rank the screens to determine the next best screen.

Figure 3:
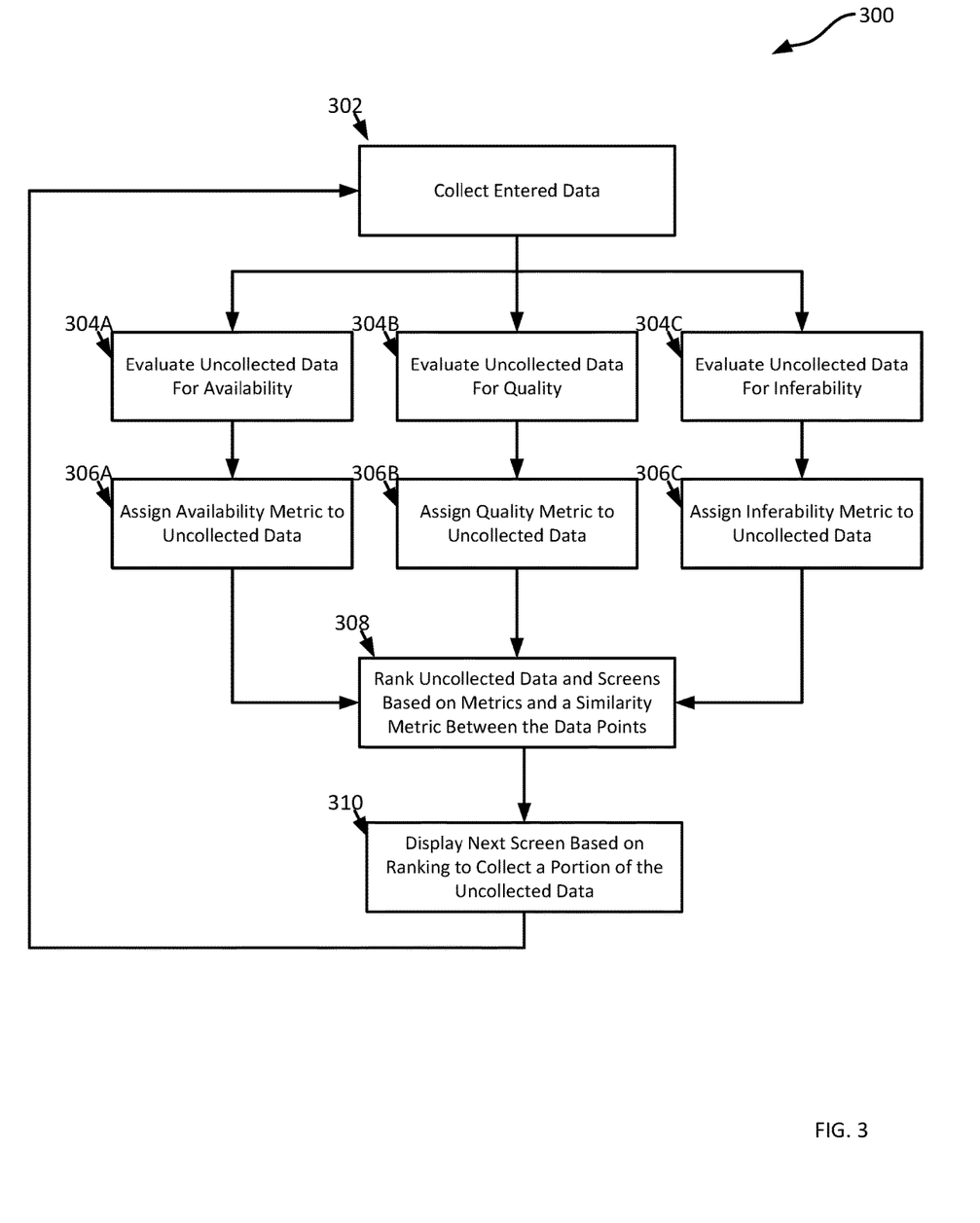
FIG. 3 shows an example method of computing metrics and ranking data entry screens based on the metrics, based on the principles disclosed herein.

FIG. 3 shows an example method 300 of determining metrics and ranking data entry screens based on the metrics, based on the principles disclosed herein. In step 302, data is collected from the user via a data collection screen. This collected data may be used to auto-populate various tax forms. The collected data may also be used to infer other tax related data for entry into the tax forms. After the collected data is utilized, the system evaluates the data that still needs to be collected "uncollected data". This evaluation is performed in steps 304A, 304B and 304C based on data availability, data quality and data infer-ability. Based on this evaluation, the system then assigns metrics to the uncollected data in steps 306A, 306B and 306C. These metrics may be a numerical value indicative of data availability, data quality and data infer-ability for the uncollected data. Once the metrics are assigned, the system, in step 308 uses the metrics to rank the uncollected data. In step 308, the system also evaluates combinations of a subset of the top ranked uncollected data in reference to a similarity metric (contextual similarity between the top ranked uncollected data), where each combination of the subset of the top ranked uncollected data represents a possible candidate data entry screen for display to the user. These candidate data entry screens are ranked from most to least important based on the similarity metric and the data point rankings. The most important screen (e.g. the screen having the highest ranking) is then displayed to the user. In other words, candidates for the next data entry screen are dynamically populated by the system with unique combinations of a subset of questions related to the top ranked uncollected data, and the screens are ranked based on the similarity metric and the data point rankings to determine the next best screen.

Ranking data points and the resultant dynamically populated data entry screens can based on various algorithms that utilize the metrics described above. Specifically, these metrics can be applied to statistics-based ranking algorithms or ranking models.

FIG. 4 shows an example method 400 of ranking data and screens based on statistics-based ranking algorithms, based on the principles disclosed herein. In step 402, the system analyzes the computed metrics based on one or more raking algorithms that may include but are not limited to harmonic mean and/or greedy choice for each data point. For example, if harmonic mean is the chosen ranking algorithm then the system computes the reciprocal of the arithmetic mean of the three metrics for use in ranking each data point. The harmonic mean may be beneficial for ranking since the three metrics are unrelated. In addition, the harmonic mean is generally more biased towards the smaller values of the metrics which mitigates the impact outlier metrics that may not be accurate. In other words, each data point is ranked based on a comparison of their respective harmonic means. In contrast, if greedy choice is the chosen ranking algorithm, then the system selects the greatest metric for use in ranking each data point. In other words, each data point is ranked based on a comparison of their greatest metric. This may be beneficial in choosing the most optimal data to request at each screen transition.

In addition, the metrics in either scenario may be weighted depending on the importance of each metric relative to the others. For example, quality and infer-ability may have higher rankings that availability to ensure that the best data is collected early in the process. In either case, the data points are ranked in step 404 according to the ranking algorithms. Once the data points are ranked, the screens can then be dynamically populated and ranked based on the data points included per screen. In step 406, the system evaluates the screens based on various combinations of a subset of the ranked data points. Specifically, the system can choose a subset of the top ranked N data points, create various combinations of the selected subset of the data points, and then in step 408, rank the combinations (e.g. the candidate screens) based on the data point rankings and based on a similarity metric between the data points. For example, in the TurboTax use case, if the system chooses the top three ranked data points as (dependents, own a home, and student loans) various combinations of two or more of these questions relating to these data points can be generated as possible candidate screens (Candidate Screen 1: Do you have dependents? Do you own a home?; Candidate Screen 2: Do you own a home? Do you have any student loans?). The system may then rank these candidate screens based on the rankings of data points and based on a semantic similarity metric which may reveal that Candidate Screen 1 is a better option for the next best screen, because the questions of Candidate Screen 1 are higher ranked and/or are more semantically similar to one another and therefore easier for the user to answer related questions (i.e. home and dependents are more semantically similar data points than home and student loans). Candidate Screen 1 is therefore be the top ranked screen that is displayed to the user.

FIG. 5 shows an example method 500 of a recommender system for ranking data points and data entry screens based on trained ranking models, based on the principles disclosed herein. In general, if there are N data points to collect, each data point is used by the ranking model to perform a prediction to determine how valuable each data point is versus other data points at making an accurate prediction of the next best screen. This process can be repeated for various numbers and combinations of N data points to determine the best combination of weighted data points to create the most accurate predictor for providing a recommendation on the next best screen.

For example, a recommender system such as a trained model (e.g. Bandits, Neural Network, etc.) can be created in step 502. In step 504, the model can be trained to rank the data screens based on known data. This known data may include screens and results previously collected from the user or other users. In step 506, this collected data, along with the computed metrics can be input into the trained model such that that trained model computes outputs of screen rankings in step 508.

For example, if the model is a neural network such as an artificial neural network (ANN), the ANN includes various node layers comprising an input layer, hidden layers and an output layer. The input layer of the neural network may include multiple input values including but not limited to the data point metrics described above (e.g. information availability, information quality, information infer-ability and information similarity). Each node of the hidden layer may include an associated weight for each input which are summed and compared to a threshold (i.e. activation function) for evaluating the metrics and passing data along to the next layer in the network for ranking purposes. The goal is for the hidden layers to rank the data points, rank the possible data entry screen candidates based on the ranked data points and information similarity, and for the output layer to output the highest ranked screen for display to the user. During training, the ANN is fed computed metrics and data point rankings into the input layer. The output layer outputs the predicted best screen, (i.e. highest ranked screen) which is then compared to the known best screen associated with the known metrics, known data point rankings and known screens from previous users to determine if the ANN prediction is correct. Based on this comparison, the weights of the nodes in the layers are adjusted accordingly, with the goal of accurately predicting the best screen. Once the ANN is trained to predict the best screen, it can be confirmed by inputting an additional known data set for comparison. This additional known data set is different than the data set used for training with the goal of ensuring that the model is not overfitted. If the ANN is confirmed to be properly trained and not overfitted, it is deployed for use in new cases. Of course, the ANN can go through a periodic training refinement process based on newly collected results.

In another example, if the model is bandits model (e.g. multi-armed bandits), the model explores the metrics to determine the metric that provides the best assessment for choosing the next best screen. For example, during training, the model is fed known metrics. The model bandits model uses this information to rank data points and possible candidate screens, and develop predictions which are compared the predictions to the known optimal results using a rewards and/or regrets training metric. The goal is to revise the algorithmic weights to maximize the rewards and/or minimize the regrets for the predictions.

FIG. 6 shows an example of a system 600 configured for facilitating the dynamic navigation of data entry screens as described above. It should be understood that the components of the system 600 shown in FIG. 6 and described herein are merely examples and systems with additional, alternative, or fewer number of components should be considered within the scope of this disclosure.

As shown, the system 600 comprises user device 602 and server 606 interconnected through a network 604. Server 606 supports operation of the underlying Application (e.g. TurboTax), while user device 602 is a PC but could be any device (e.g., smartphone, tablet, etc.) providing access to the servers via network 604. User device 602 has a user interface UI, which may be used to communicate with the servers using the network 604 via a browser or via software applications. The network 604 may be the Internet and or other public or private networks or combinations thereof. The network 604 therefore should be understood to include any type of circuit switching network, packet switching network, or a combination thereof. Non-limiting examples of the network 604 may include a local area network (LAN), metropolitan area network (MAN), wide area network (WAN), and the like.

Server 606 and user device 602 are each depicted as single devices for ease of illustration, but those of ordinary skill in the art will appreciate that server 606 and user device 602 may be embodied in different forms for different implementations. For example, any or each of the servers may include a plurality of servers including a plurality of databases, etc. Alternatively, the operations performed by any of the servers may be performed on fewer (e.g., one or two) servers. In another example, a plurality of user devices (not shown) may communicate with the servers.

Furthermore, a single user may have multiple user devices (not shown), and/or there may be multiple users (not shown) each having their own respective user devices (not shown). Regardless, the hardware configuration shown in FIG. 6 may be a system that supports the functionality for facilitating the dynamic navigation of data entry screens as described above shown in FIGS. 1-5.

FIG. 7 shows a block diagram of an example computing device 700 that is configured for facilitating the dynamic navigation of data entry screens as described above based on the principles disclosed herein. For example, computing device 700 may function as the server 606 and/or user device 602, or a portion or combination thereof in some embodiments. The computing device 700 performs one or more steps of the methods shown in FIGS. 1-5. The computing device 700 is implemented on any electronic device that runs software applications derived from compiled instructions, including without limitation personal computers, servers, smart phones, media players, electronic tablets, game consoles, email devices, etc. In some implementations, the computing device 700 includes one or more processors 702, one or more input devices 704, one or more display devices 706, one or more network interfaces 708, and one or more computer-readable media 710. Each of these components is coupled by a bus 712.

Display device 706 includes any display technology, including but not limited to display devices using Liquid Crystal Display (LCD) or Light Emitting Diode (LED) technology. Processor(s) 702 uses any processor technology, including but not limited to graphics processors and multi-core processors. Input device 704 includes any known input device technology, including but not limited to a keyboard (including a virtual keyboard), mouse, track ball, and touch-sensitive pad or display. Bus 712 includes any internal or external bus technology, including but not limited to ISA, EISA, PCI, PCI Express, USB, Serial ATA or FireWire. Computer-readable medium 710 includes any non-transitory computer readable medium that provides instructions to processor(s) 702 for execution, including without limitation, non-volatile storage media (e.g., optical disks, magnetic disks, flash drives, etc.), or volatile media (e.g., SDRAM, ROM, etc.).

Computer-readable medium 710 includes various instructions 714 for implementing an operating system (e.g., Mac OS®, Windows®, Linux). The operating system may be multi-user, multiprocessing, multitasking, multithreading, real-time, and the like. The operating system performs basic tasks, including but not limited to: recognizing input from input device 704; sending output to display device 706; keeping track of files and directories on computer-readable medium 710; controlling peripheral devices (e.g., disk drives, printers, etc.) which can be controlled directly or through an I/O controller; and managing traffic on bus 712. Network communications instructions 716 establish and maintain network connections (e.g., software for implementing communication protocols, such as TCP/IP, HTTP, Ethernet, telephony, etc.).

Application(s) 718 may comprise an application that uses or implements the processes described herein and/or other processes. The processes may also be implemented in the operating system.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment. In one embodiment, this may include Python. The computer programs therefore are polyglots.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random-access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a backend component, such as a data server, or that includes a middleware component, such as an application server or an Internet server, or that includes a front-end component, such as a user computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include user devices and servers. A user device and server may generally be remote from each other and may typically interact through a network. The relationship of user device and server may arise by virtue of computer programs running on the respective computers and having a relationship with each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method performed by a processor, the method comprising:

displaying, by a user device, a first screen via a graphical user interface (GUI) to a user to collect a first portion of data, wherein the first screen is part of a sequence of data entry screens that are configured to collect the data from the user;

receiving, by the server, the first portion of data entered by a user into the first screen;

determining, by the server, a collection format of the first portion of data, the collection format being an electronic format or a paper format;

determining, by the server, metrics of the first portion of data, the determining of the metrics comprising determining an availability metric corresponding to a level of difficulty in collecting the first portion of data from the user based on the collection format of the first portion of data determined by the server, and setting the availability metric as a first numerical value when the collection format is the electronic format, and setting the metric availability metric as a second numerical value when the collection format is the paper format, ranking, by the server, the sequence of data entry screens according to respective ranking values, the respective ranking values determined based on the determined metrics including the first numerical value and the second numerical value of the availability metric; and displaying, by the user device, a second screen having the highest ranking value among the respective ranking values in the ranked sequence of data entry screens via the GUI to the user to collect a second portion of data.

2. The method of claim 1, further comprising:
receiving, by the server, the second portion of data entered by a user into the second screen;
determining, by the server, metrics of the second portion of data;
ranking, by the server, the sequence of data entry screens based on the determined metrics; and
displaying, by the user device, a third screen via the GUI to the user to collect a third portion of data, wherein the third screen is ranked highest among the ranked sequence of data entry screens.

3. The method of claim 1, further comprising:
repeatedly executing, by the server, receiving portions of the data, determining metrics of the portions of data, ranking the sequence of data entry screens based on the determined metrics and displaying the highest ranked screen until the sequence of data entry screens is determined to be complete.

4. The method of claim 1, further comprising:
choosing, by the server, the first screen based on user information collected prior to the sequence of data entry screens.

5. The method of claim 1, further comprising:
determining, by the server, the metrics including a quality metric indicating how well the first portion of data can be used to determine other data, an infer-ability metric indicating how well the first portion of data can be inferred from other data, and a similarity metric indicating a level of similarity between the first portion of data.

6. The method of claim 1, further comprising:
ranking, by the server, the sequence of data entry screens based on the determined metrics by computing the harmonic mean across three or more of the metrics or by computing a greedy choice across three or more of the metrics.

7. The method of claim 1, further comprising:
ranking, by the server, the sequence of data entry screens based on the determined metrics by executing a machine learning model that infers the ranking based on the metrics and other data including the first portion of the data.

8. The method of claim 7, further comprising:
training, by the server, the machine learning model by inputting known metrics and corresponding known user data from previous users into the model, comparing the inferred ranking to a known ranking of screens and adjusting the machine learning model to more accurately infer future rankings of screens.

9. The method of claim 1,
determining, by the server, the metrics based on the difficulty in the user determining and entering the first portion of data into the GUI, and based on how much information is obtained from and is inferable from the first portion of data.

10. The method of claim 1,
determining, by the server, the metrics to minimize a number of screens in the sequence of data entry screens displayed to the user.

11. A system comprising:
a non-transitory storage medium storing computer program instructions; and
one or more processors configured to execute the computer program instructions to cause operations comprising:
displaying, by a user device, a first screen via a graphical user interface (GUI) to a user to collect a first portion of data, wherein the first screen is part of a sequence of data entry screens that are configured to and collect the data from the user;
receiving, by the server, the first portion of data entered by a user into the first screen;
determining, by the server, a collection format of the first portion of data, the collection format being an electronic format or a paper format;
determining, by the server, metrics of the first portion of data, the determining of the metrics comprising determining an availability metric corresponding to a level of difficulty in collecting the first portion of data from the user based on the collection format of the first portion of data determined by the server and setting the availability metric as a first numerical value when the collection format is the electronic format, and setting the metric availability metric as a second numerical value when the collection format is the paper format;
ranking, by the server, the sequence of data entry screens according to respective ranking values, the respective ranking values determined based on the determined metrics including the first numerical value and the second numerical value of the availability metric; and
displaying, by the user device, a second screen having the highest ranking value among the respective ranking values in the ranked sequence of data entry screens via the GUI to the user to collect a second portion of data.

12. The system of claim 11, wherein the operations further comprise:
receiving, by the server, the second portion of data entered by a user into the second screen;
determining, by the server, metrics of the second portion of data;
ranking, by the server, the sequence of data entry screens based on the determined metrics; and
displaying, by the user device, a third screen via the GUI to the user to collect a third portion of data, wherein the third screen is ranked highest among the ranked sequence of data entry screens.

13. The system of claim 11, wherein the operations further comprise:
repeatedly executing, by the server, receiving portions of the data, determining metrics of the portions of data, ranking the sequence of data entry screens based on the determined metrics and displaying the highest ranked screen until the sequence of data entry screens is determined to be complete.

14. The system of claim 11, wherein the operations further comprise:

choosing, by the server, the first screen based on user information collected prior to the sequence of data entry screens.

15. The system of claim 11, wherein the operations further comprise:

determining, by the server, the metrics including a quality metric indicating how well the first portion of data can be used to determine other data, an infer-ability metric indicating how well the first portion of data can be inferred from other data, and a similarity metric indicating a level of similarity between the first portion of data.

16. The system of claim 11, wherein the operations further comprise:

ranking, by the server, the sequence of data entry screens based on the determined metrics by computing the harmonic mean across three or more of the metrics or by computing a greedy choice across three or more of the metrics.

17. The system of claim 11, wherein the operations further comprise:

ranking, by the server, the sequence of data entry screens based on the determined metrics by executing a machine learning model that infers the ranking based on the metrics and other data including the first portion of the data.

18. The system of claim 11, wherein the operations further comprise:

training, by the server, the machine learning model by inputting known metrics and corresponding known user data from previous users into the model, comparing the inferred ranking to a known ranking of screens and adjusting the machine learning model to more accurately infer future rankings of screens.

19. The system of claim 11, wherein the operations further comprise:

determining, by the server, the metrics based on the difficulty in the user determining and entering the first portion of data into the GUI, and based on how much information is obtained from and is inferable from the first portion of data.

20. The system of claim 11, wherein the operations further comprise:

determining, by the server, the metrics to minimize a number of screens in the sequence of data entry screens displayed to the user.

\* \* \* \* \*